(12) United States Patent
Dürr et al.

(10) Patent No.: US 8,700,189 B2
(45) Date of Patent: Apr. 15, 2014

(54) COUPLING OF ERP SYSTEMS WITH PROCESS CONTROL SYSTEMS FOR THE AUTOMATED TRANSMISSION OF PLANT STRUCTURES AND PLANT DATA

(75) Inventors: Thomas Dürr, Erlangen (DE); Paul Herrmann, Karlsruhe (DE); Wilfried Sicking, Erlangen (DE); Michael Unkelbach, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 469 days.

(21) Appl. No.: 12/712,363

(22) Filed: Feb. 25, 2010

(65) Prior Publication Data

US 2010/0223087 A1 Sep. 2, 2010

(30) Foreign Application Priority Data

Feb. 27, 2009 (DE) .......................... 10 2009 010 795

(51) Int. Cl.
*G05B 13/02* (2006.01)

(52) U.S. Cl.
USPC ............... 700/29; 700/51; 709/217; 709/218; 340/511

(58) Field of Classification Search
None
See application file for complete search history.

(56) References Cited

U.S. PATENT DOCUMENTS

| | | | |
|---|---|---|---|
| 6,657,806 B1 * | 12/2003 | Winarski et al. ................. 360/69 |
| 6,795,798 B2 * | 9/2004 | Eryurek et al. ................ 702/188 |
| 6,822,820 B1 * | 11/2004 | Winarski et al. ................. 360/69 |
| 6,954,713 B2 * | 10/2005 | Eryurek ......................... 702/140 |
| 7,103,427 B2 * | 9/2006 | Dillon .............................. 700/83 |
| 7,162,534 B2 * | 1/2007 | Schleiss et al. ............... 709/232 |
| 7,557,702 B2 * | 7/2009 | Eryurek et al. ............... 340/511 |
| 2002/0077711 A1 * | 6/2002 | Nixon et al. .................... 700/51 |
| 2002/0147506 A1 * | 10/2002 | Eryurek et al. ................. 700/28 |
| 2002/0169514 A1 * | 11/2002 | Eryurek et al. ............... 700/110 |
| 2003/0014500 A1 * | 1/2003 | Schleiss et al. ............... 709/218 |
| 2003/0028268 A1 * | 2/2003 | Eryurek et al. ................. 700/73 |
| 2004/0186927 A1 | 9/2004 | Eryurek |
| 2004/0204775 A1 * | 10/2004 | Keyes et al. .................... 700/29 |
| 2004/0230328 A1 * | 11/2004 | Armstrong et al. ............. 700/83 |
| 2005/0007249 A1 * | 1/2005 | Eryurek et al. ............... 340/511 |
| 2005/0033466 A1 * | 2/2005 | Eryurek et al. ............... 700/108 |
| 2007/0067725 A1 * | 3/2007 | Cahill et al. .................. 715/733 |
| 2008/0077512 A1 | 3/2008 | Grewal |

FOREIGN PATENT DOCUMENTS

DE 102004038808 A1 12/2005
EP 1906279 A2 4/2008

OTHER PUBLICATIONS

Wernwe Kalkhoff, "Agent-Oriented Robot Task Transformation", Proceedings of the International Symposium on Intelligent Control, IEEE, pp. 242-247 (Aug. 27, 1995).*
Lighthammer Software Development, "Illuminator .TM. The 1.sub.st 'Plant information Portal'.TM." (Copyright 1999).*
Mazeda et al., "Supervision and Optimised Process Control in Sugar beet Factories," Centre of Sugar Technology, Spain from www.univ-reims.fr/externes/avh10mazaeda.pdf.*

(Continued)

*Primary Examiner* — Gurkanwaljit Singh

(57) ABSTRACT

A method for maintaining a technical plant including several components is provided. The method provides a system for planning the use of an enterprise resources system and a control system, with the enterprise resource system connected to the control system and structures of the technical plant are automatically set up in the enterprise resource system.

9 Claims, 4 Drawing Sheets

(56) References Cited

OTHER PUBLICATIONS

Theron, "ISA-95 A Foundation Model for Business Intelligence for Manufacturing", White Paper, Jul. 2008, Incuity, URL: http://www.automation.com/pdf_articles/ISA_95_White_paper.pdf_-_final.pdf.

Bezjak et al., "B2MML for Plant Maintenance and Asset Management in a global, service orientated, MES scenario"WBF European Conference, Barcelona, Spain, Nov. 10-12, 2008, URL: https://www.wbf.org/catalog/images/WBF2008EU-Bezjak-Zeller-38.pdf.

Communication From European Patent Office, Mar. 26, 2012, pp. 1-5.

* cited by examiner

COUPLING OF ERP SYSTEMS WITH PROCESS CONTROL SYSTEMS FOR THE AUTOMATED TRANSMISSION OF PLANT STRUCTURES AND PLANT DATA

CROSS REFERENCE TO RELATED APPLICATIONS

This application claims priority of German Office application No. 10 2009 010 795.9 DE filed Feb. 27, 2009, which is incorporated by reference herein in its entirety.

FIELD OF INVENTION

The invention relates to a method for maintaining a technical plant

BACKGROUND OF INVENTION

Enterprise Resource Planning (ERP) refers to the entrepreneurial task of using the resources (capital, production equipment or personnel) available in an enterprise in as efficient a way as possible for the operational chain.

An ERP system is currently used in many businesses for tracking costs and order transactions. Maintenance data and processes are also increasingly implemented there.

Conventionally, these ERP systems are not coupled to process control systems. The structures and associated master data and/or characteristics are maintained separately by hand in each instance.

Many features of the ERP system are also required in the control technology and must therefore be input twice. Considerable effort is required to keep both systems in synchrony (e.g. with a module changeover etc.).

The data is currently entered by hand; a regular, automated consistency maintenance does not exist.

SUMMARY OF INVENTION

The object of the invention is therefore to provide a method, with which a rapid and reliable initial data feed of ERP systems can take place with the plant structure and/or plant data and a regular consistency maintenance is facilitated.

This object is achieved in accordance with the invention by the method as claimed in the claims. Advantageous developments of the invention are defined in the dependent claims. By the ERP system being connected to the control system and structures of the technical plant being automatically set up in the ERP system, in order to maintain a technical plant having several components, comprising a system for planning the use of enterprise resources (ERP system) and a control system, the following is achieved:

The effort involved in the first illustration of the plant in the ERP system is reduced by coupling the control and ERP systems. During subsequent operation, complicated alignment processes between the systems are omitted. The representation of the information from both systems results in systematic errors being identified more quickly and at the same time optimization of the maintenance activities (e.g. if multiple repair work is unsuccessful, because the procedural design of the plant part was not adequate). Combining the diagnostic and/or control technology departments and the maintenance department at the user's end is enabled and/or facilitated, since with the inventive method both use the same information and systems.

The structures of the technical plant advantageously include functional locations and infrastructures, facilities or equipment. The functional locations referred to in ERP systems as functional locations represent the level of detail under the plant level. Notifications and work orders contain references to functional locations. Functional locations refer to sites where work is completed. They represent a building, a floor or a room. Equipment relates to identifiable objects, which are installed and maintained independently of the building or room, or are exchanged, such as for instance an air compressor, an air supply unit or an electrical control board.

It is expedient for the threshold values to be set up for the components.

Maintenance-relevant data (for status-specific maintenance) is advantageously transferred from the control system to the ERP system so that a prewarning can be and/or is triggered if a threshold value is exceeded. It is also advantageous if maintenance requirements are released.

In the inventive method, a maintenance measure of the ERP system is advantageously planned with the aid of a graphical user interface of the control system.

It is expedient here if control-specific and ERP information are displayed together in order to determine a possible approach.

The information advantageously includes a final repair, duration and cost.

It is also advantageous if an overall maintenance history of a component is displayed, with a display expediently taking place in accordance with an order type (calibration, maintenance, fault).

It is likewise advantageous if associated alarms and trend lines are displayed throughout an observation period.

The particular business administration advantage is that the technician on site is relieved of tasks which are necessary from the business administration perspective but are prone to error and irksome to a technician, such as filling out forms etc. A data alignment between the ERP system and control system is dispensed with since the same data is accessed.

BRIEF DESCRIPTION OF THE DRAWINGS

The invention is described in more detail by way of example with the aid of the drawings, in which schematically and not to scale.

DETAILED DESCRIPTION OF INVENTION

Figure 1:
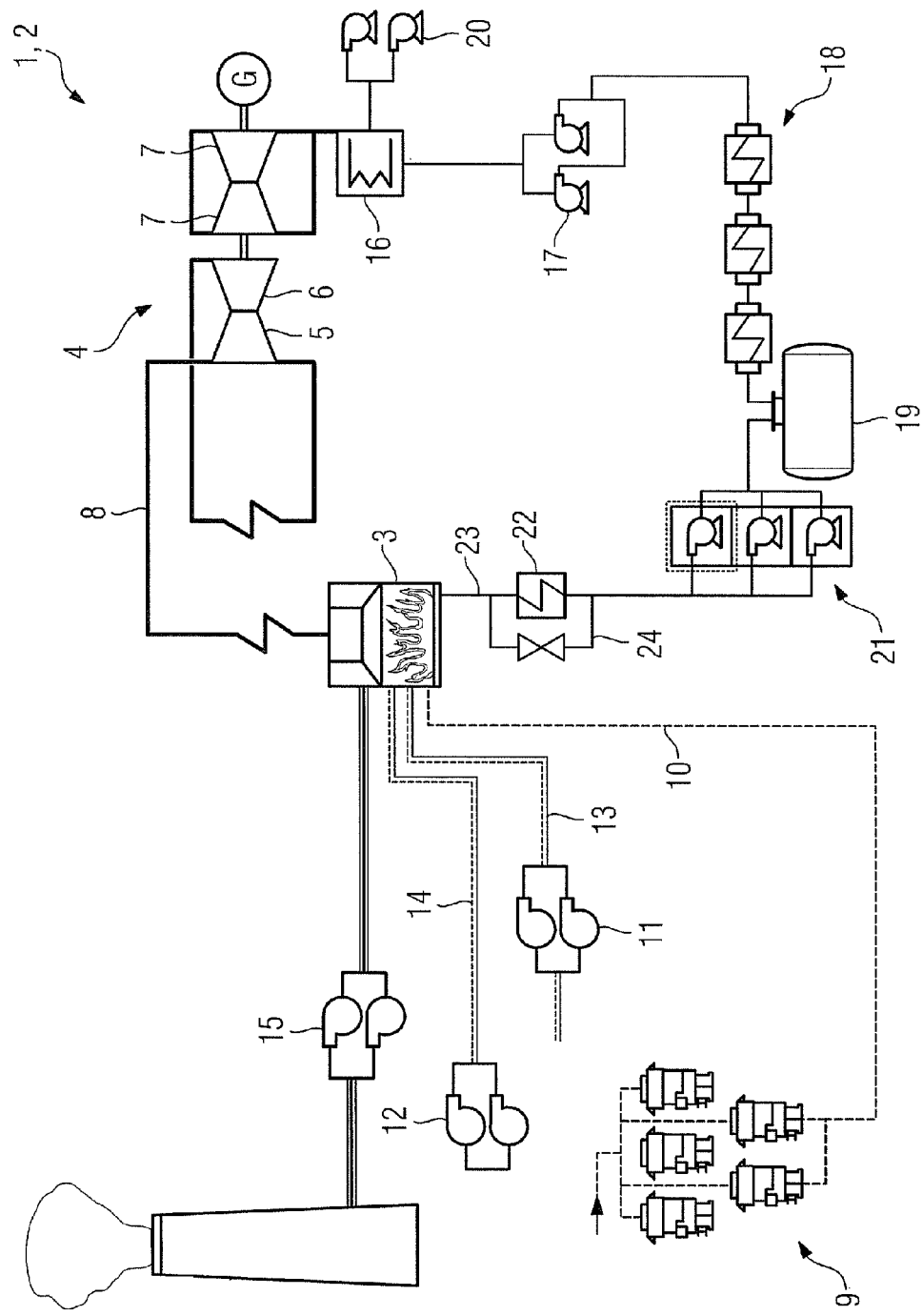
FIG. 1 shows a representation of a system overview of the control system.

FIG. 1 shows a schematic and exemplary representation of an overview of a technical plant 1 using the example of a steam power plant 2.

The steam power plant 2 according to FIG. 1 has a steam generator 3 and a steam turbine 4 with high 5, middle 6 and low pressure 7 stages, which is connected to a fresh steam line 8 leaving the steam generator 3. Carbon dust is fired in the steam generator 3, which is provided by coal pulverizers 9 by way of a supply facility 10.

The steam generator 3 is supplied with combustion air by means of a forced draught fan 11 and/or a pressurized air fan 12, which are connected to corresponding air supply lines 13, 14 of the steam generator 3. Induced draught ventilators 15 on the exhaust gas side provide corresponding firing assistance.

A condenser 16 for the expanded steam with condensate pumps 17 is arranged downstream of the steam turbine 4, said condensate pumps 17 pumping the condensate via a lower pressure preheating stage 16 into a feed water container 19, which simultaneously functions as a degasser. Circulating pumps 20 provide for the cooling of the condenser 16. Feed water pumps 21 are connected to the downstream feed water preheater 22 on the feed water container 19, said feed water preheater 22 being disposed in the feed water supply line 23 of the steam generator 3 and being avoidable by way of a bypass 24.

Figure 2:
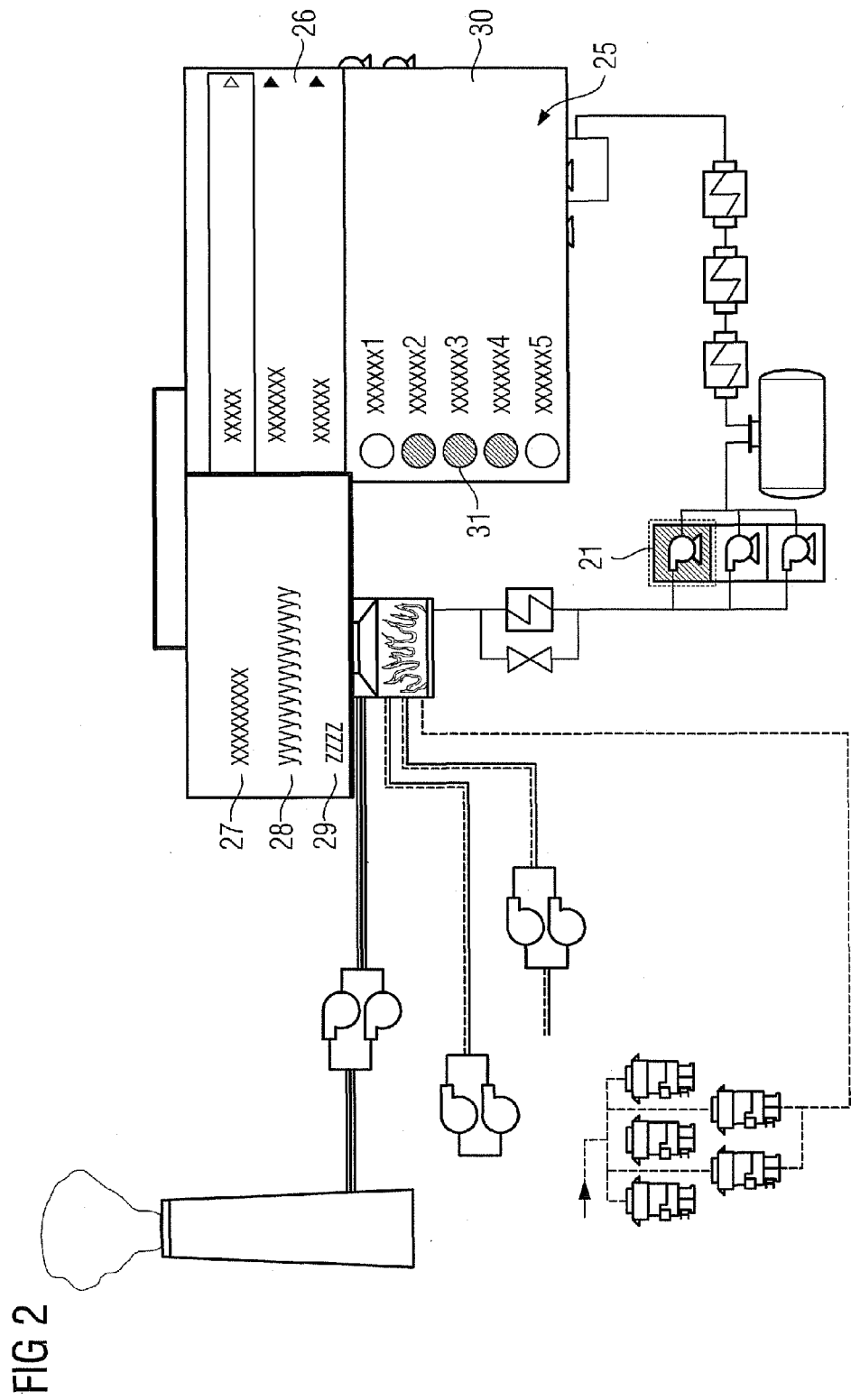
FIG. 2 shows a representation of a system overview of the control system in the event of a fault or maintenance with an open context menu for faulty components with associated maintenance information for the component.
Figure 3:
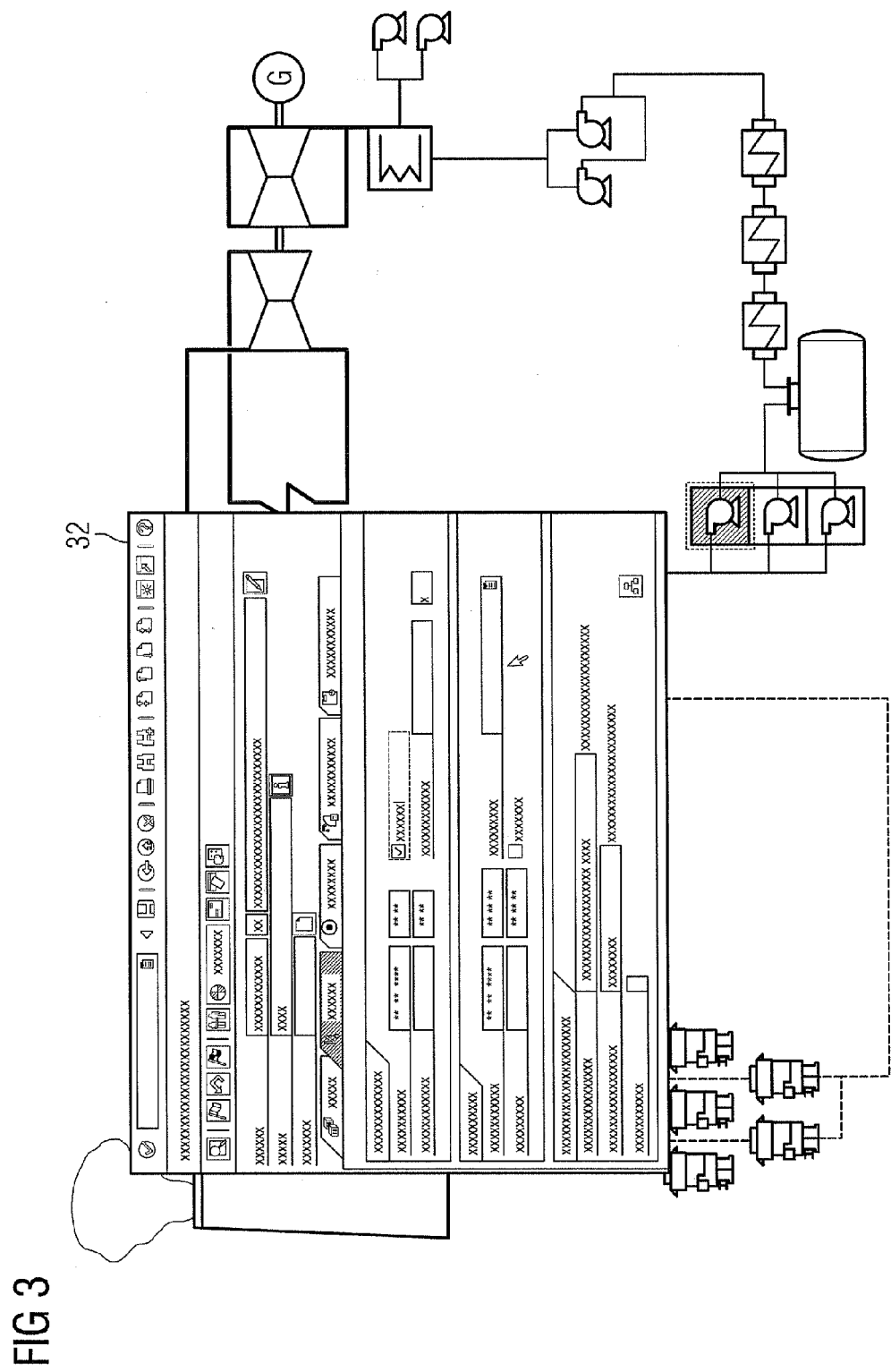
FIG. 3 shows a representation of a plant overview of the control system in the event of a fault or maintenance with a started maintenance program of the ERP system and FIG. 4 shows a schematic representation of the plant structure in the two systems.

FIG. 2 shows the same steam power plant 2 in the event of a fault and/or maintenance of one of the feed water pumps 21. A color coding for the availability of the components enables a graphical monitoring of the technical plant 1 and the associated maintenance tasks.

A graphical navigation through the illustrated system takes place in hierarchical data (drill down navigation), in which the different properties of available information objects are used in order to refine the analysis thereof and/or search therefor step by step. This procedure enables a "zoom in" function, whereby the available data can be taken into account with different degrees of detail. In the case of the feed water pump 21, an information and navigation menu 25 can be opened for instance by way of a right click on the color-coded symbol of the faulty component. In the static part 26 of the menu 25, e.g. drawings 27, characteristic curves 28 and manuals 29 are linked and can be retrieved by clicking thereon. Current status requests can take place in the dynamic part 30.

After selecting a corresponding entry for allocating work orders 31 in the dynamic part 30 of the information and navigation menu 25, the maintenance program of the ERP system is started and the corresponding entry mask 32 is opened.

Figure 4:
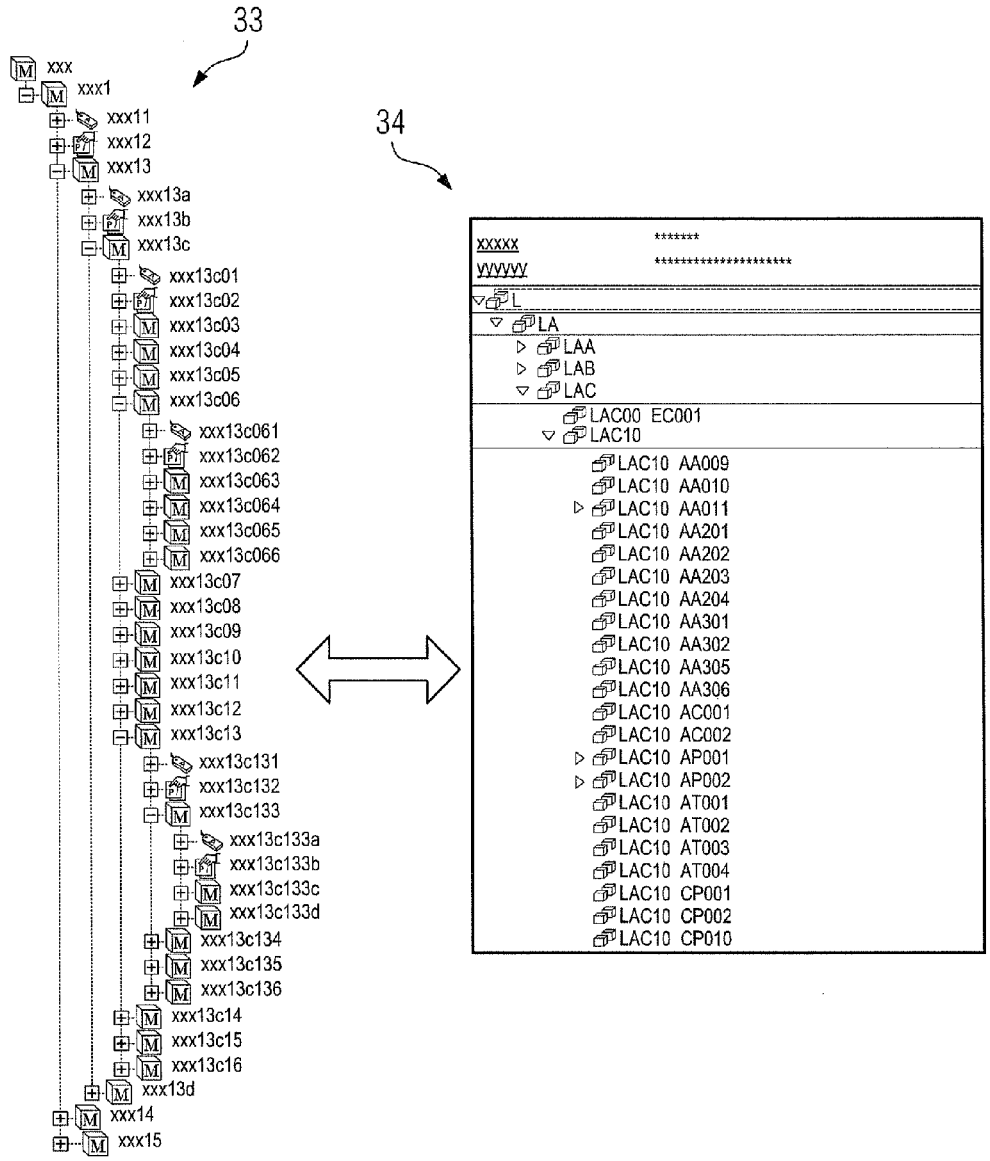

FIG. 4 shows a schematic representation of the structure of the technical plant 1 in the two systems; control technology 33 and ERP 34. The directory structure represents the logical configuration of the systems. A tree structure, which begins with a root (left) and then branches to the right, is usual. Files and also further directories can lie in each level of the tree. By way of example, FIG. 4 shows the topmost structuring level achieved in the branch of the ERP system shown.

The image of the structure of the control system in the ERP system allows attributes of the components represented to be exchanged between the systems, thereby accelerating the initial data feed of the ERP system and also ongoing consistency maintenance and rendering the same less error-prone.

The invention claimed is:

1. A method for maintaining a technical plant including several components, the plant comprising an enterprise resources system for planning use of enterprise resources and a control system for controlling operation of the plant, the method comprising:
    coupling via a data feed the enterprise resources system to the control system;
    setting up, automatically, a plurality of structures of the technical plant in the enterprise resource system that provides an image of the control system in the enterprise resources system in the form of a tree structure;
    exchanging via the data feed attributes of the components and maintenance-relevant data of the technical plant between the control system and enterprise resources system;
    displaying together on a graphical user interface enterprise resources system information and control system information to enable monitoring of both the technical plant via the control system and associated maintenance tasks via the enterprise resources system; and
    upon an occurrence of a fault or maintenance of a component, planning a maintenance measure of the enterprise resources system by:
        displaying as part of the control system information a color-coded symbol for the component;
        opening an information and navigation menu upon receiving a selection of the color-coded symbol, the information and navigation menu providing a static part comprising drawing and manuals for the component and a dynamic part comprising current status requests for the component; and
        starting a maintenance program of the enterprise resources system and opening an entry mask on the graphical user interface upon receiving a selection for allocating a work order in the dynamic part of the control system information.

2. The method as claimed in claim 1, where the plurality of structures comprise a plurality of functional locations and infrastructures, facilities, or equipment.

3. The method as claimed in claim 1, further comprising setting up a plurality of threshold values for the components.

4. The method as claimed in claim 1, wherein a prewarning is triggered when a threshold value is exceeded.

5. The method as claimed in claim 1, wherein a plurality of maintenance requirements are triggered.

6. The method as claimed in claim 1, wherein the enterprise resource system information comprises a last repair, a repair period, or costs of a repair.

7. The method as claimed in claim 1, wherein an overall maintenance history of a component is displayed on the graphical user interface.

8. The method as claimed in claim 7, wherein a representation takes place in accordance with an order type.

9. The method as claimed in claim 1, wherein a plurality of associated alarms and trend lines are displayed throughout an observation period.

* * * * *